(12) United States Patent
Furuyama et al.

(10) Patent No.: US 9,733,557 B2
(45) Date of Patent: Aug. 15, 2017

(54) FLUORESCENT WHEEL FOR PROJECTORS AND LIGHT EMITTING DEVICE FOR PROJECTORS

(71) Applicant: NIPPON ELECTRIC GLASS CO., LTD., Otsu-shi, Shiga (JP)

(72) Inventors: Tadahito Furuyama, Otsu (JP); Tamio Ando, Otsu (JP); Shunsuke Fujita, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/028,069

(22) PCT Filed: Oct. 21, 2014

(86) PCT No.: PCT/JP2014/077893
§ 371 (c)(1),
(2) Date: Apr. 8, 2016

(87) PCT Pub. No.: WO2015/068562
PCT Pub. Date: May 14, 2015

(65) Prior Publication Data
US 2016/0238922 A1    Aug. 18, 2016

(30) Foreign Application Priority Data

Nov. 8, 2013  (JP) .................................. 2013-232224
Dec. 27, 2013  (JP) .................................. 2013-272218
(Continued)

(51) Int. Cl.
*G03B 21/20*    (2006.01)
*F21V 29/00*    (2015.01)
(Continued)

(52) U.S. Cl.
CPC .......... *G03B 21/204* (2013.01); *F21V 29/502* (2015.01); *G02B 5/0808* (2013.01);
(Continued)

(58) Field of Classification Search
CPC .... G03B 21/204; G03B 21/16; G02B 26/008; G02B 5/0808; F21V 29/502; H04N 9/3114; H04N 9/3144; H04N 9/3158
See application file for complete search history.

(56) References Cited

U.S. PATENT DOCUMENTS

2011/0234998 A1    9/2011    Kurosaki
2012/0286319 A1    11/2012   Lee et al.
(Continued)

FOREIGN PATENT DOCUMENTS

CN    102200683 A    9/2011
CN    102779932 A    11/2012
(Continued)

OTHER PUBLICATIONS

Official Communication issued in International Patent Application No. PCT/JP2014/077893, mailed on Jan. 20, 2015.

*Primary Examiner* — Thomas M Sember
(74) *Attorney, Agent, or Firm* — Keating and Bennett, LLP

(57) ABSTRACT

Provided is a fluorescent wheel for a projector capable of suppressing the heating of the phosphor layer and a light emitting device for a projector using the same. The fluorescent wheel for a projector includes: a phosphor layer (12); an annular ceramic substrate (11) which includes a first principal surface provided with the phosphor layer (12) and a second principal surface located on an opposite side to the first principal surface and has a higher thermal conductivity
(Continued)

than the phosphor layer (12); and a reflective layer (13) provided on the second principal surface of the ceramic substrate (11).

15 Claims, 6 Drawing Sheets

(30) Foreign Application Priority Data

| | | | |
|---|---|---|---|
| Apr. 21, 2014 | (JP) | ................................ | 2014-087391 |
| Jul. 23, 2014 | (JP) | ................................ | 2014-149524 |

(51) Int. Cl.

| | |
|---|---|
| *G02B 26/00* | (2006.01) |
| *F21V 29/502* | (2015.01) |
| *H04N 9/31* | (2006.01) |
| *G02B 5/08* | (2006.01) |
| *G03B 21/16* | (2006.01) |

(52) U.S. Cl.
CPC ............ *G02B 26/008* (2013.01); *G03B 21/16* (2013.01); *H04N 9/3114* (2013.01); *H04N 9/3144* (2013.01); *H04N 9/3158* (2013.01)

(56) References Cited

U.S. PATENT DOCUMENTS

| | | |
|---|---|---|
| 2012/0327374 A1 | 12/2012 | Kitano et al. |
| 2013/0056775 A1 | 3/2013 | Kawakami |
| 2013/0286359 A1 | 10/2013 | Motoya et al. |
| 2015/0168820 A1 | 6/2015 | Kurosaki |

FOREIGN PATENT DOCUMENTS

| | | |
|---|---|---|
| JP | 2004-341105 A | 12/2004 |
| JP | 2011-187295 A | 9/2011 |
| JP | 2011-187798 A | 9/2011 |
| JP | 2012-243624 A | 12/2012 |
| JP | 2013-029831 A | 2/2013 |
| JP | 2013-228598 A | 11/2013 |

[FIG. 1.]
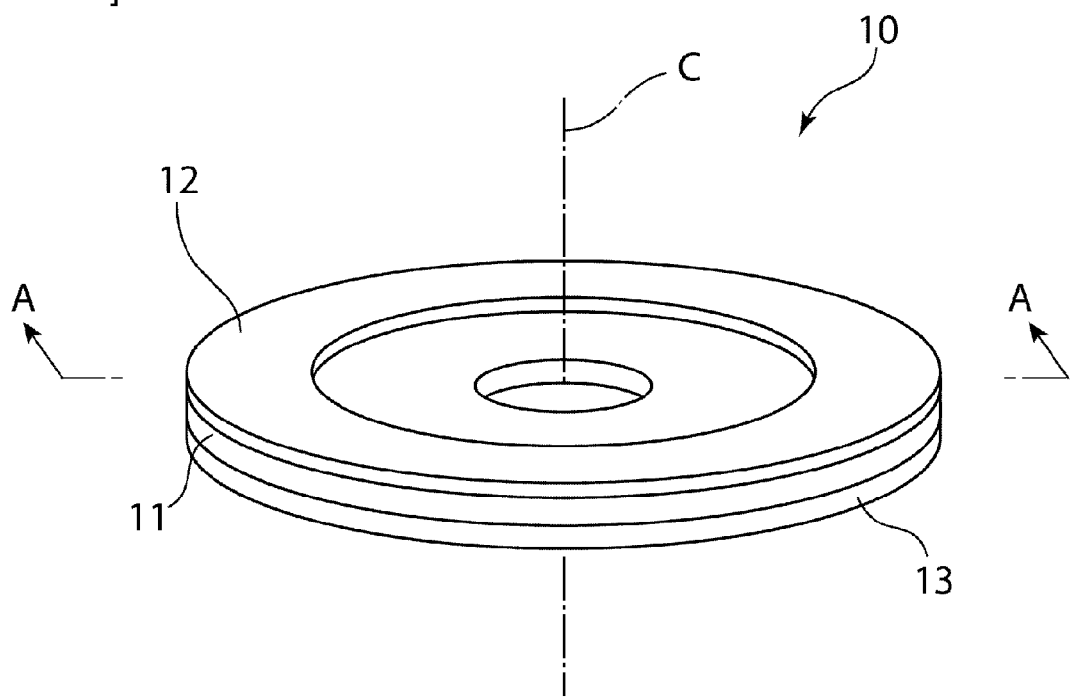
[FIG. 2.]
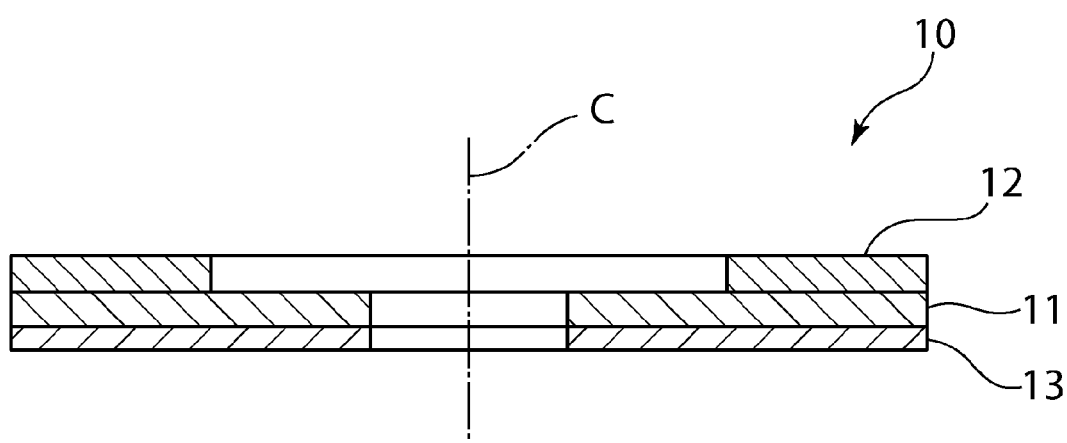

[FIG. 3.]
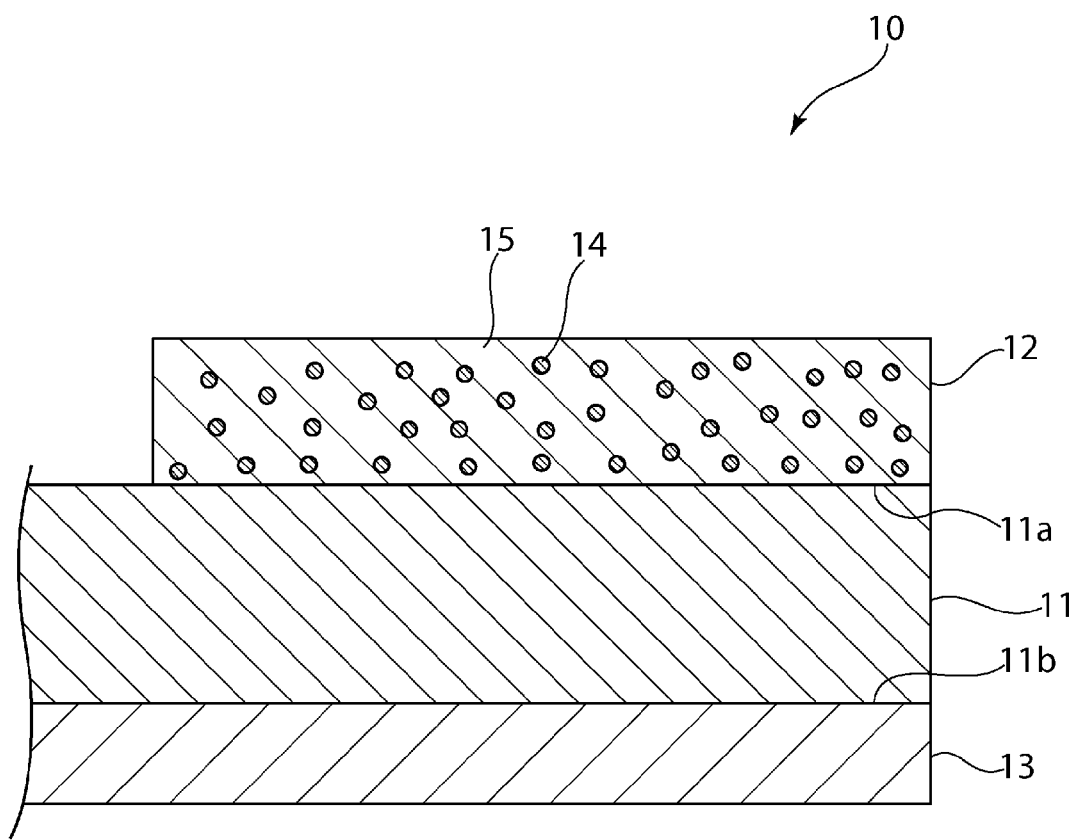
[FIG. 4.]
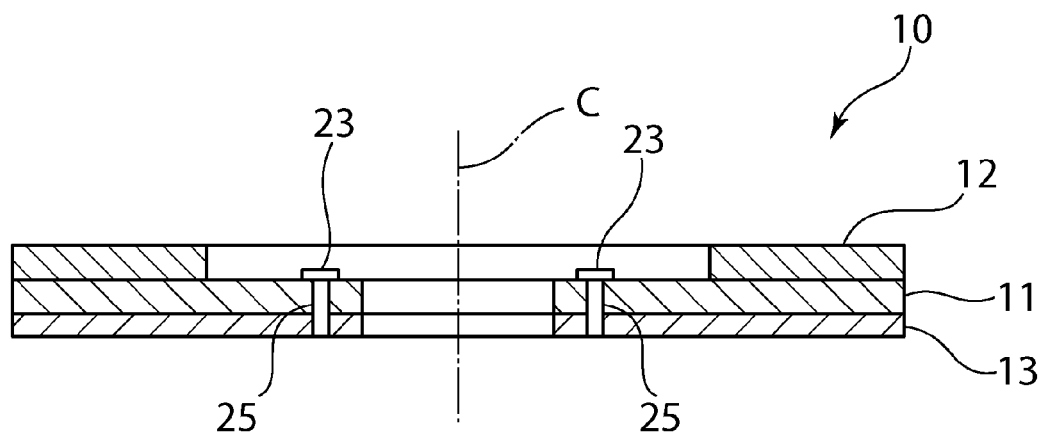

[FIG. 5.]
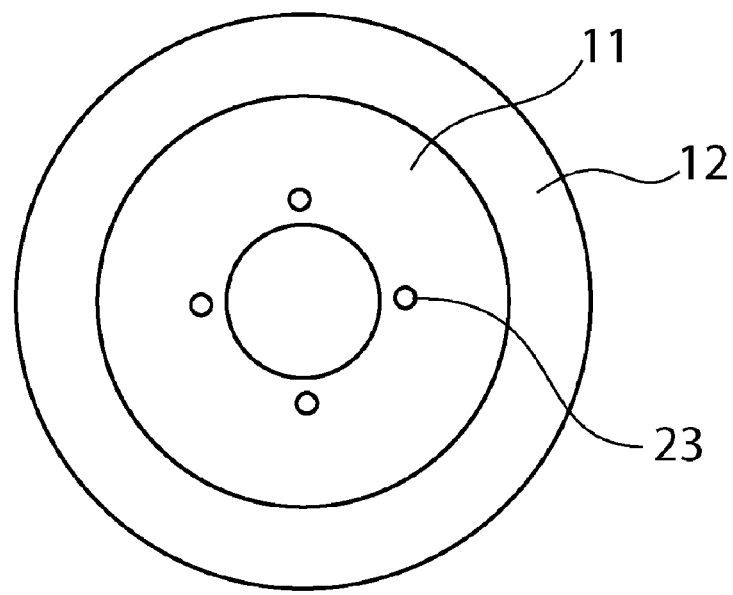
[FIG. 6.]
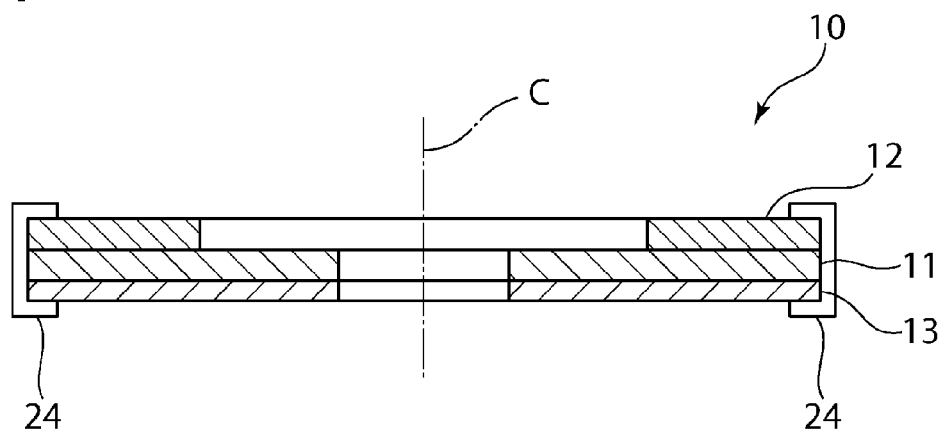

[FIG. 7.]
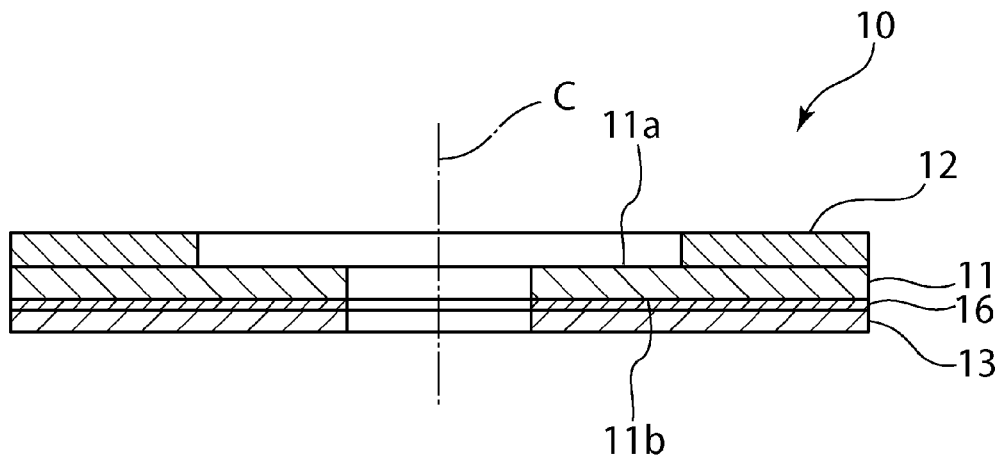
[FIG. 8.]
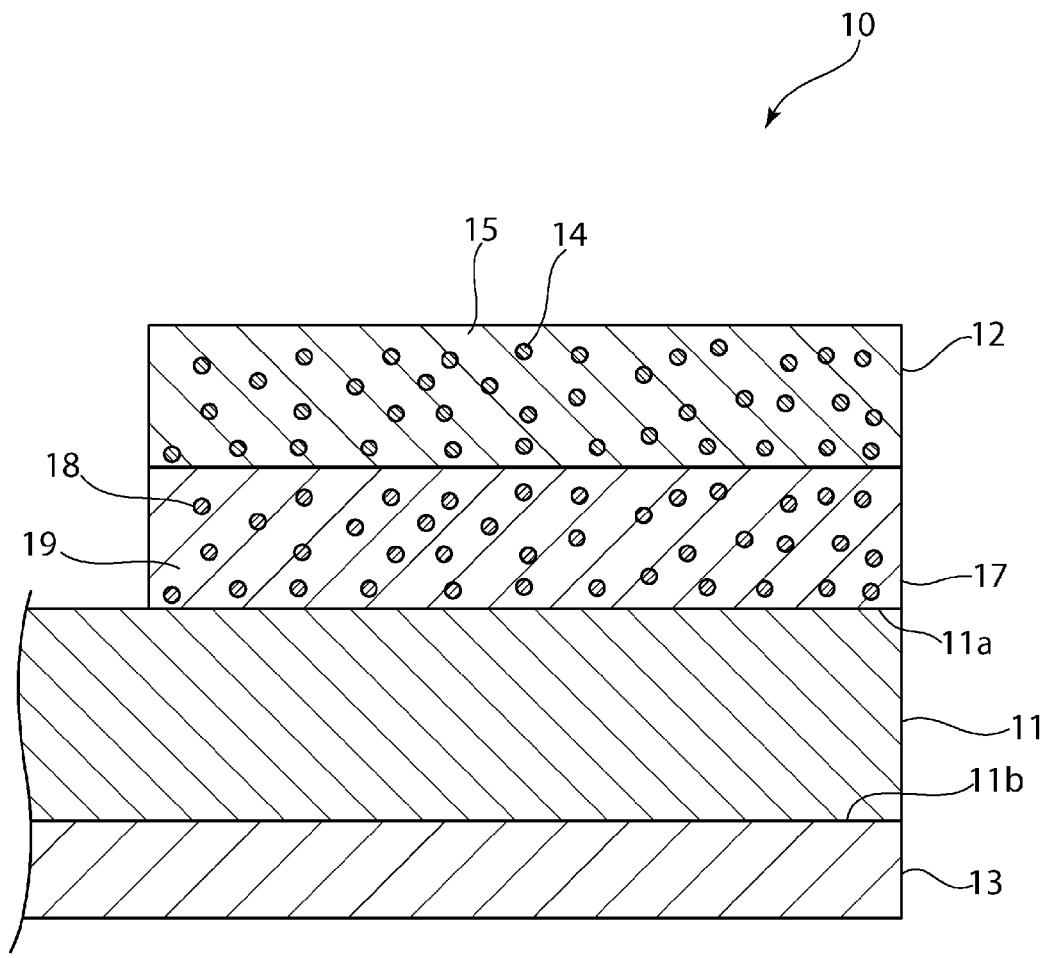

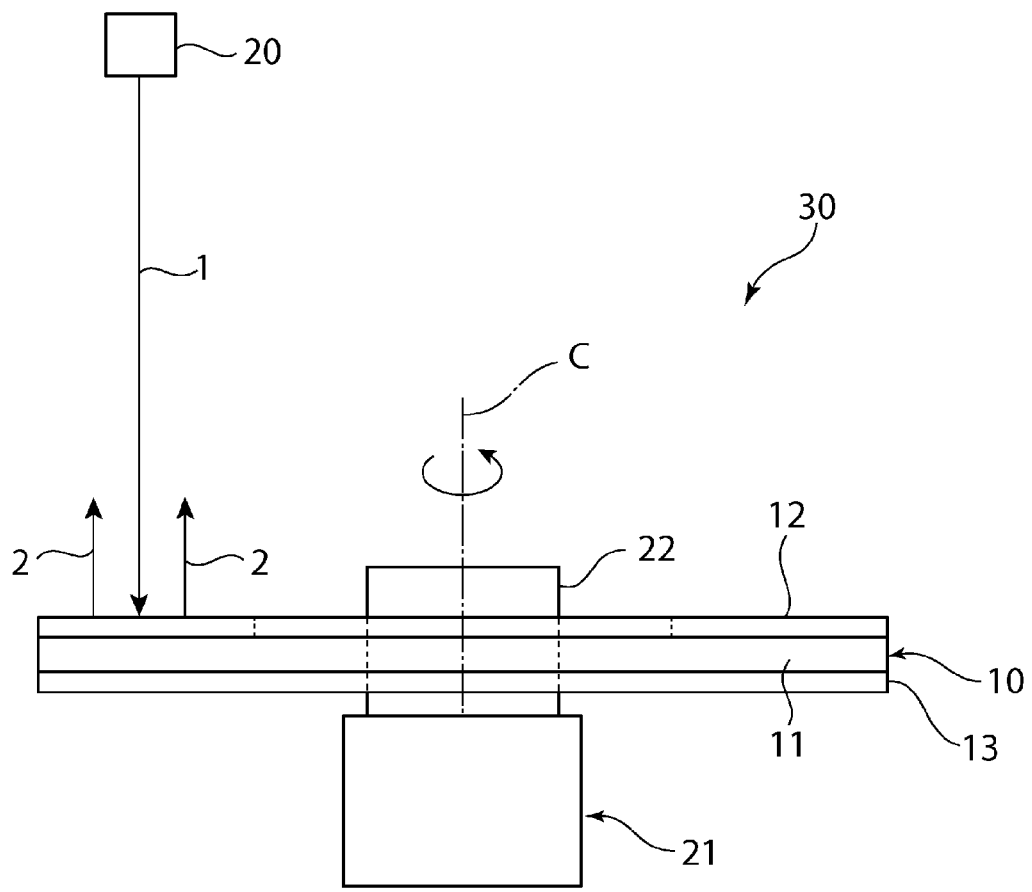
[FIG. 9.]

[FIG. 10.]
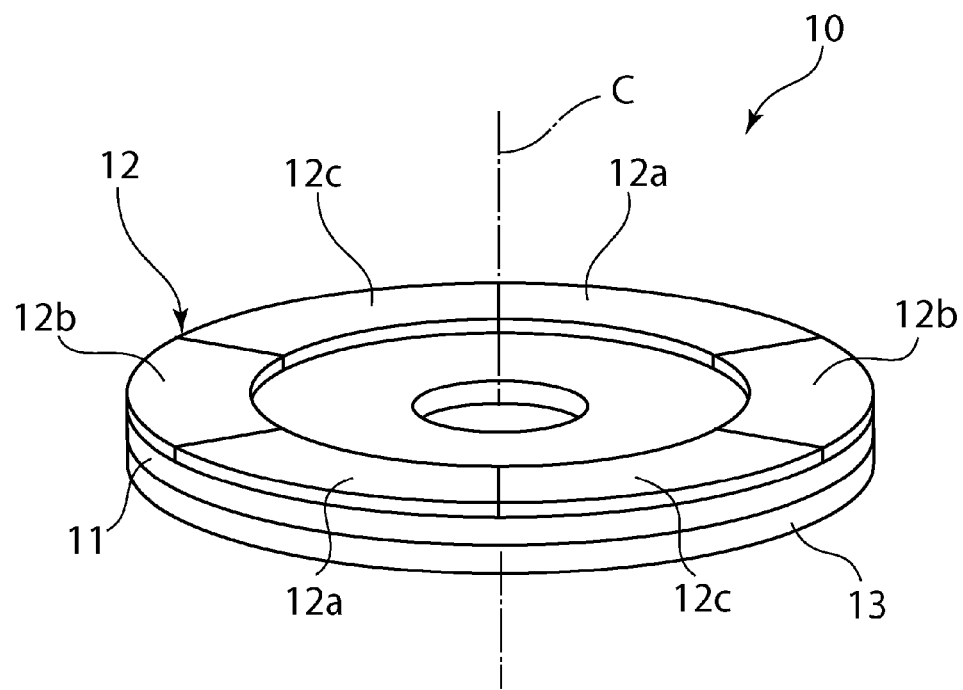

FLUORESCENT WHEEL FOR PROJECTORS AND LIGHT EMITTING DEVICE FOR PROJECTORS

TECHNICAL FIELD

This invention relates to fluorescent wheels for projectors and light emitting devices for projectors.

BACKGROUND ART

To reduce projector size, there have recently been proposed light emitting devices in which an LED (light emitting diode) and a phosphor are used. For example, Patent Literature 1 discloses a projector in which use is made of a light emitting device including: a light source configured to emit ultraviolet light; and a phosphor layer configured to convert the ultraviolet light from the light source into visible light. In Patent Literature 1, a fluorescent wheel is described which is produced by providing an annular phosphor layer on an annular rotatable transparent substrate.

CITATION LIST

Patent Literature

[PTL 1]
JP-A-2004-341105

SUMMARY OF INVENTION

Technical Problem

With the use of a high-power light source as the light source, the phosphor generates heat upon application of excitation light, so that the phosphor layer is heated. When the phosphor layer is heated, there may arise a problem of decreased fluorescence intensity or a problem of peeling of the phosphor layer from the substrate.

An object of the present invention is to provide a fluorescent wheel for a projector capable of suppressing the heating of the phosphor layer and a light emitting device for a projector using the same.

Solution to Problem

A fluorescent wheel for a projector according to the present invention includes: a phosphor layer; an annular ceramic substrate which includes a first principal surface provided with the phosphor layer and a second principal surface located on an opposite side to the first principal surface and has a higher thermal conductivity than the phosphor layer; and a reflective layer provided on the second principal surface of the ceramic substrate.

The reflective layer is preferably a reflective metal layer or a reflective glass layer.

The phosphor layer is preferably bonded by fusion to the ceramic substrate.

The phosphor layer is preferably bonded by an inorganic bonding layer to the ceramic substrate.

The reflective layer is preferably a reflective metal substrate. In this case, the reflective metal substrate is preferably an aluminum substrate.

A thermally conductive layer may be provided on a region of the second principal surface. In this case, the reflective layer is in turn provided on the thermally conductive layer.

The thermally conductive layer is preferably formed of a thermally conductive paste. An example of the thermally conductive paste that can be cited is a paste containing metal particles.

The fluorescent wheel for a projector according to the present invention may further include a scattering layer provided between the phosphor layer and the ceramic substrate. The scattering layer contains inorganic particles made of an oxide or nitride of at least one selected from the group consisting of Al, Nb, Ta, La, Zr, Ce, Ga, Mg, Si, and Zn.

The phosphor layer preferably contains a glass matrix and a phosphor dispersed in the glass matrix.

The scattering layer preferably contains a glass matrix and inorganic particles dispersed in the glass matrix.

The glass matrix of the phosphor layer is preferably made of substantially the same glass as the glass matrix of the scattering layer.

The phosphor layer may be divided into a plurality of regions along a circumferential direction thereof and the plurality of regions may contain different types of phosphors.

A light emitting device for a projector according to the present invention includes the above-described fluorescent wheel for a projector and a light source capable of irradiating the phosphor layer of the fluorescent wheel with excitation light.

Advantageous Effects of Invention

The present invention can suppress the heating of the phosphor layer in the fluorescent wheel for a projector.

BRIEF DESCRIPTION OF DRAWINGS

FIG. 1 is a perspective view showing a fluorescent wheel for a projector according to a first embodiment of the present invention.

FIG. 2 is a schematic cross-sectional view along the line A-A shown in FIG. 1.

FIG. 3 is a schematic partial cross-sectional view showing on an enlarged scale the vicinity of a phosphor layer in the fluorescent wheel for a projector according to the first embodiment of the present invention.

FIG. 4 is a schematic cross-sectional view showing an example of the case where a reflective metal substrate is used as a reflective layer in the fluorescent wheel for a projector according to the first embodiment of the present invention.

FIG. 5 is a schematic plan view of the fluorescent wheel for a projector shown in FIG. 4.

FIG. 6 is a schematic cross-sectional view showing another example of the case where a reflective metal substrate is used as a reflective layer in the fluorescent wheel for a projector according to the first embodiment of the present invention.

FIG. 7 is a schematic cross-sectional view showing a fluorescent wheel for a projector according to a second embodiment of the present invention.

FIG. 8 is a schematic partial cross-sectional view showing on an enlarged scale the vicinity of a phosphor layer in a fluorescent wheel for a projector according to a third embodiment of the present invention.

FIG. 9 is a schematic side view showing a light emitting device for a projector in which the fluorescent wheel for a projector according to the first embodiment of the present invention is used.

FIG. 10 is a perspective view showing a fluorescent wheel for a projector according to a fourth embodiment of the present invention.

DESCRIPTION OF EMBODIMENTS

Hereinafter, a description will be given of preferred embodiments. However, the following embodiments are simply illustrative and the present invention is not intended to be limited to the following embodiments. In the drawings, elements having substantially the same functions may be referred to by the common references.

FIG. 1 is a perspective view showing a fluorescent wheel for a projector according to a first embodiment of the present invention. FIG. 2 is a schematic cross-sectional view along the line A-A shown in FIG. 1. FIG. 3 is a schematic partial cross-sectional view showing on an enlarged scale the vicinity of a phosphor layer in the fluorescent wheel for a projector according to the first embodiment of the present invention. As shown in FIGS. 1 to 3, a fluorescent wheel 10 has an annular shape. The fluorescent wheel 10 includes: a phosphor layer 12; an annular ceramic substrate 11 which includes a first principal surface 11a provided with the phosphor layer 12 and a second principal surface 11b located on the opposite side to the first principal surface 11a; and a reflective layer 13 provided on the second principal surface 11b of the ceramic substrate 11. The ceramic substrate 11 has a higher thermal conductivity than the phosphor layer 12.

In this embodiment, the phosphor layer 12 is composed of a glass matrix 15 and a phosphor 14 dispersed in the glass matrix 15. In this embodiment, particles of an inorganic phosphor are used as the phosphor 14.

No particular limitation is placed on the type of the glass matrix 15 so long as it can be used as a dispersion medium for the phosphor 14, such as an inorganic phosphor. Examples that can be used include borosilicate-based glasses and phosphate-based glasses. The softening point of the glass matrix 15 is preferably 250° C. to 1000° C. and more preferably 300° C. to 850° C.

No particular limitation is placed on the type of the phosphor 14 so long as it can emit fluorescence upon entry of excitation light. Specific examples of the phosphor 14 that can be cited include one or more selected from the group consisting of, for example, oxide phosphor, nitride phosphor, oxynitride phosphor, chloride phosphor, oxychloride phosphor, sulfide phosphor, oxysulfide phosphor, halide phosphor, chalcogenide phosphor, aluminate phosphor, halophosphoric acid chloride phosphor, and garnet-based compound phosphor. With the use of blue light as excitation light, a phosphor capable of emitting as fluorescence, for example, green light, yellow light or red light can be used.

The average particle size of the phosphor 14 is preferably 1 μm to 50 μm and more preferably 5 μm to 25 μm. If the average particle size of the phosphor 14 is too small, the luminescence intensity may be decreased. On the other hand, if the average particle size of the phosphor 14 is too large, the luminescent color may be uneven.

The content of the phosphor 14 in the phosphor layer 12 is preferably in a range of 5 to 80% by volume, more preferably in a range of 10 to 75% by volume, and still more preferably in a range of 20 to 70% by volume.

The thickness of the phosphor layer 12 is preferably small within a range that excitation light can be surely absorbed into the phosphor 14. The reason for this is that if the phosphor layer 12 is too thick, scattering and absorption of light in the phosphor layer 12 may become too much, so that the efficiency of emission of fluorescence may be low. Specifically, the thickness of the phosphor layer 12 is preferably 1 mm or less, more preferably 0.5 mm or less, and still more preferably 0.3 mm or less. The lower limit of the thickness of the phosphor layer 12 is generally about 0.03 mm.

The phosphor layer 12 is provided on the first principal surface 11a of the ceramic substrate 11. As described previously, the ceramic substrate 11 has a higher thermal conductivity than the phosphor layer 12. Highly thermal conductive ceramics can be used as the ceramic substrate 11. Examples of the highly thermal conductive ceramics that can be cited include aluminum oxide-based ceramics, aluminum nitride-based ceramics, silicon carbide-based ceramics, boron nitride-based ceramics, magnesium oxide-based ceramics, titanium oxide-based ceramics, niobium oxide-based ceramics, zinc oxide-based ceramics, and yttrium oxide-based ceramics.

The thickness of the ceramic substrate 11 is preferably 50 μm to 1000 μm, more preferably 100 μm to 800 μm, and still more preferably 200 μm to 500 μm. If the thickness of the ceramic substrate 11 is too large, the fluorescence may be likely to propagate through the ceramic substrate 11 in the width direction and leak outside. On the other hand, if the thickness of the ceramic substrate 11 is too small, the mechanical strength may be decreased, so that the ceramic substrate 11 may be broken when rotated as a wheel.

The phosphor layer 12 is preferably bonded by fusion to the ceramic substrate 11. An example of a method for boding by fusion that can be cited is a method of laying the phosphor layer 12 on top of the first principal surface 11a of the ceramic substrate 11 and applying heat and pressure to them to fusion bond the ceramic substrate 11 and the glass matrix 15 of the phosphor layer 12 together. Alternatively, the phosphor layer 12 may be bonded by an inorganic bonding layer to the ceramic substrate 11. Specifically, an example that can be cited is a method of applying a transparent inorganic material on the first principal surface 11a of the ceramic substrate 11 by a sol-gel method, laying the phosphor layer 12 on top of the transparent inorganic material, and applying heat to them. Examples of the transparent inorganic material for the sol-gel method include polysilazane. Polysilazane is capable of reacting on moisture in the air to generate ammonia and become condensed to form a $SiO_2$ coating. As just described, a coating agent capable of forming an inorganic glass coating at relatively low temperatures (room temperature to 200° C.) can be used as the transparent inorganic material. Other than the above, coating agents can be used which contain an alcohol-soluble organic silicon compound or other metal compounds (organic or inorganic) and form a $SiO_2$ network, like glass, at relatively low temperatures in the presence of a catalyst. When such a coating agent is used together with a metal alkoxide as an organometallic compound and an alcohol as a catalyst, hydrolysis and dehydration are promoted, resulting in the formation of a $SiO_2$ network.

By bonding the phosphor layer 12 by fusion or an inorganic bonding layer to the ceramic substrate 11, the thermal conductivity from the phosphor layer 12 to the ceramic substrate 11 can be further enhanced.

The reflective layer 13 is provided on the second principal surface 11b of the ceramic substrate 11. By the provision of the reflective layer 13, excitation light and fluorescence having penetrated the ceramic substrate 11 can be reflected toward the ceramic substrate 11.

Examples of the reflective layer 13 that can be cited include a reflective metal layer and a reflective glass layer.

An example of the reflective metal layer that can be cited is a thin silver or aluminum film. Examples of a method for forming a thin metal film that can be cited include plating as well as vacuum deposition, ion plating, and sputtering which are physical vapor deposition methods. Alternatively, a thin silver film can be formed by applying a paste of silver clay on the second principal surface 11b of the ceramic substrate 11 and applying heat to the paste.

A reflective metal substrate made of metal or alloy may be used as the reflective metal layer. Such a reflective metal substrate may undergo surface treatment. The preferred reflective metal substrate is that having a high reflectance and an aluminum substrate is preferably used as the reflective metal substrate. An example of the aluminum substrate that can be cited is an aluminum substrate having a surface on which a reflectivity enhancing coating made of a metal oxide or other materials is formed. An example of such an aluminum substrate that can be cited include Miro (registered trademark) and Miro-Silver (registered trademark) both manufactured by Alanod.

By providing a reflective metal layer as the reflective layer 13, heat transferred from the phosphor layer 12 to the ceramic substrate 11 can be further transferred to the reflective layer 13, so that heat can be more efficiently released to the outside.

The reflective glass layer is composed of, for example, a glass matrix and inorganic particles dispersed in the glass matrix. The preferred inorganic particle is that having a different refractive index from the glass matrix and generally a higher refractive index than the glass matrix. More specifically, the inorganic particle is preferably an oxide or nitride of at least one selected from the group consisting of Al, Nb, Ti, Ta, La, Zr, Ce, Ga, Mg, Si, B, and Zn. Preferred specific examples of the inorganic particle that can be cited include aluminum oxide, niobium oxide, titanium oxide, tantalum oxide, lanthanum oxide, zirconium oxide, cerium oxide, gallium oxide, magnesium oxide, silicon oxide, zinc oxide, aluminum nitride, silicon nitride, and boron nitride. The particularly preferred inorganic particle that is used is aluminum oxide. Examples of the glass matrix that can be used include those cited in the above description of the glass matrix 15 of the phosphor layer 12.

The average particle size of the inorganic particles is preferably in a range of 0.1 µm to 30 µm and more preferably in a range of 0.5 µm to 10 µm. If the average particle size of the inorganic particles is too small, a sufficient reflectance may be less likely to be obtained. On the other hand, if the average particle size of the inorganic particles is too large, the number of possible particles per unit volume becomes small, so that a sufficient reflectance may be less likely to be obtained.

The content of the inorganic particles in the reflective glass layer is preferably in a range of 5 to 90% by volume, more preferably in a range of 20 to 85% by volume, and still more preferably in a range of 30 to 80% by volume. If the content of the inorganic particles is too large, the amount of glass binding the inorganic particles together becomes small, so that dust may be produced in use or the strength of the reflective glass layer may be reduced. On the other hand, if the content of the inorganic particles is too small, a sufficient reflectance is less likely to be obtained.

Voids are preferably formed in the reflective glass layer. Since the voids are formed, the reflectance at the reflective glass layer can be further enhanced. Because the refractive index of the air in the voids is as small as 1.0, they can have significant differences in refractive index from the glass matrix (for example, a refractive index of about 1.4 to about 1.8) and the inorganic particles (for example, a refractive index of about 1.4 to about 2.2) in the reflective glass layer, thus providing a greater reflectance. The voidage is preferably 20 to 80% and more preferably 30 to 70%. If the voidage is too small, the effect of enhancing the reflectance is less likely to be obtained. On the other hand, if the voidage is too large, the strength of bonding to the ceramic substrate 11 is likely to be decreased.

The thickness of the reflective layer 13 is preferably in a range of 0.01 µm to 2000 µm, more preferably in a range of 0.1 µm to 1500 µm, and still more preferably in a range of 1 µm to 1000 µm. If the reflective layer 13 is a reflective glass layer, the thickness thereof is preferably in a range of 10 µm to 2000 µm, more preferably in a range of 50 µm to 1500 µm, and still more preferably in a range of 100 µm to 1000 µm. If the thickness of the reflective layer 13 is too small, fluorescence penetrates the reflective layer 13, so that a sufficient reflectance is less likely to be obtained. If the thickness of the reflective layer 13 is too large, the fluorescent wheel 10 becomes large in weight and thus may be broken by vibration when rotated. Furthermore, if the reflective layer 13 is a reflective glass layer, light is likely to propagate through the reflective glass layer and leak from the end surface of the reflective glass layer, so that the luminescence intensity may be decreased.

The reflective layer 13 can be bonded to the ceramic substrate 11, for example, by forming the reflective layer 13 on the second principal surface 11b of the ceramic substrate 11. Alternatively, a separately produced reflective layer 13 (such as a reflective metal substrate) may be bonded by a bonding material to the ceramic substrate 11. The bonding material is preferably transparent. However, the bonding material is not limited to be transparent but non-transparent bonding materials can also be used. The term "transparent" herein means that the material can transmit excitation light having entered the phosphor layer 12 and fluorescence to be emitted from the phosphor layer 12. Specific examples of such a transparent bonding material that can be cited include silicone resins and polyimide resins.

Silicone resins that can be used are those having a general siloxane bond and among them silsesquioxanes having high thermal resistance can be particularly preferably used. Silsesquioxanes are siloxane-based compounds having a main chain skeleton formed of a Si—O—Si bond and are network polymers or polyhedral clusters having a $(RSiO_{1.5})_n$ structure obtained by hydrolyzing trifunctional silane.

Polyimide resins that can be used are so-called transparent polyimide resins and transparent polyimide resins that can be used are those commercially available from many resin manufacturers.

Furthermore, if a reflective metal substrate is used as the reflective layer 13, the ceramic substrate 11 provided with the phosphor layer 12 and the reflective metal substrate may be separately attached to the rotary shaft of a motor for rotating the fluorescent wheel 10 and made physical contact with each other.

If a reflective metal substrate is used as the reflective layer 13, the ceramic substrate 11 and the reflective metal substrate may be made physical contact with each other, as shown in FIG. 4, by joining them together by restraining members 23, such as screws. In doing so, it is possible to form through holes 25 in the ceramic substrate 11 and the reflective metal substrate and then insert the screws into the through holes 25.

FIG. 5 is a schematic plan view of the fluorescent wheel 10 as viewed from the ceramic substrate 11 side. In FIG. 5, four restraining members 23 are provided on the inward side of the phosphor layer 12 at circumferentially equal intervals in the fluorescent wheel 10. The number of restraining members 23 may be changed as necessary. However, in order to firmly secure the ceramic substrate 11 and the reflective metal substrate to each other, the restraining members 23 are preferably provided at a plurality of locations in the fluorescent wheel 10. Furthermore, if the number of restraining members 23 is too large, the mass of the fluorescent wheel 10 becomes too large, so that the fluorescent wheel 10 is likely to be broken in use. Therefore, the number of restraining members 23 is preferably two to eight and more preferably three to six.

The restraining members are not limited to screws. For example, the reflective metal substrate may be fixed to the ceramic substrate 11, as shown in FIG. 6, by clamping the fluorescent wheel 10 with clip-like restraining members 24.

FIG. 7 is a schematic cross-sectional view showing a fluorescent wheel for a projector according to a second embodiment of the present invention. In this embodiment, a thermally conductive layer 16 is provided on the second principal surface 11b of the ceramic substrate 11. Therefore, the reflective layer 13 is provided on the thermally conductive layer 16 and the thermally conductive layer 16 is intercalated between the ceramic substrate 11 and the reflective layer 13. By the intercalation of the thermally conductive layer 16 between the ceramic substrate 11 and the reflective layer 13, heat transferred from the phosphor layer 12 to the ceramic substrate 11 can be more efficiently transferred to the reflective layer 13.

In this embodiment, the thermally conductive layer 16 is provided over the entire second principal surface 11b. However, if the thermally conductive layer 16 is, for example, colored, the thermally conductive layer 16 may be provided only on a region of the second principal surface 11b corresponding to a region of the first principal surface 11a of the ceramic substrate 11 on which the phosphor layer 12 is not provided.

The thermally conductive layer 16 can be formed of, for example, a thermally conductive paste. An example of the thermally conductive paste that can be cited is a paste containing thermally conductive particles. The thermally conductive particles may be particles of a metal, such as silver or aluminum, or thermally conductive ceramic particles.

The thickness of the thermally conductive layer 16 is preferably in a range of 1 µm to 100 µm, more preferably in a range of 3 µm to 80 µm, and still more preferably in a range of 5 µm to 50 µm. If the thickness of the thermally conductive layer 16 is too small, the force of adhesion between the ceramic substrate 11 and the reflective layer 13 is likely to be decreased. If the thickness of the thermally conductive layer 16 is too large, the thermal conductivity from the ceramic substrate 11 to the reflective layer 13 is likely to be decreased.

FIG. 8 is a schematic partial cross-sectional view showing on an enlarged scale the vicinity of a phosphor layer in a fluorescent wheel for a projector according to a third embodiment of the present invention. As shown in FIG. 8, in this embodiment, a scattering layer 17 is provided between the phosphor layer 12 and the ceramic substrate 11. In this embodiment, the scattering layer 17 is composed of a glass matrix 19 and inorganic particles 18 dispersed in the glass matrix 19. The scattering layer 17 is a layer capable of scattering incident excitation light and fluorescence. Therefore, the preferred inorganic particle that is used is that having a different refractive index from the glass matrix 19. In the present invention, the inorganic particle 18 is made of an oxide or nitride of at least one selected from the group consisting of Al, Nb, Ta, La, Zr, Ce, Ga, Mg, Si, B, and Zn. Preferred specific examples of the inorganic particle 18 that can be cited include aluminum oxide, niobium oxide, tantalum oxide, lanthanum oxide, zirconium oxide, cerium oxide, gallium oxide, magnesium oxide, silicon oxide, zinc oxide, aluminum nitride, silicon nitride, and boron nitride. The particularly preferred inorganic particle 18 that is used is aluminum oxide.

Examples of the glass matrix 19 that can be used include those cited in the above description of the glass matrix 15 of the phosphor layer 12. The glass matrix 19 is preferably made of substantially the same glass as the glass matrix 15 of the phosphor layer 12. By making the glass matrix 15 of the phosphor layer 12 and the glass matrix 19 of the scattering layer 17 from substantially the same glass, fluorescence efficiently enters from the phosphor layer 12 into the scattering layer 17. In addition, it becomes less likely that peeling between the phosphor layer 12 and the scattering layer 17 will occur owing to a difference in coefficient of thermal expansion between them.

The average particle size of the inorganic particles 18 is preferably in a range of 0.3 µm to 50 µm and more preferably in a range of 0.5 µm to 30 µm. If the average particle size of the inorganic particles 18 is too small, a sufficient scattering effect is less likely to be obtained because of the wavelength dependency of Rayleigh scattering. On the other hand, if the average particle size of the inorganic particles 18 is too large, the number of possible particles per unit volume becomes small, so that a sufficient scattering effect is less likely to be obtained.

The content of the inorganic particles 18 in the scattering layer 17 is preferably in a range of 5 to 80% by volume, more preferably in a range of 10 to 70% by volume, and still more preferably in a range of 20 to 60% by volume. If the content of the inorganic particle 18 is too large, the strength of bonding to the phosphor layer 12 is likely to be decreased. On the other hand, if the content of the inorganic particles 18 is too small, a sufficient scattering effect is less likely to be obtained.

The thickness of the scattering layer 17 is preferably in a range of 10 µm to 500 µm, more preferably in a range of 50 µm to 400 µm, and still more preferably in a range of 80 µm to 300 µm. If the thickness of the scattering layer 17 is too large, light is likely to propagate through the scattering layer 17 and leak from the end surface of the scattering layer 17. As a result, the luminescence intensity is likely to be decreased. On the other hand, if the thickness of the scattering layer 17 is too small, a sufficient scattering effect is less likely to be obtained.

In this embodiment, the scattering layer 17 is provided between the ceramic substrate 11 and the phosphor layer 12. By the provision of the scattering layer 17, fluorescence emitted from the phosphor layer 12 and excitation light having transmitted the phosphor layer 12 can be scattered in the scattering layer 17. Therefore, the luminescence efficiency can be increased to improve the luminescence intensity.

Furthermore, voids are preferably formed in the scattering layer 17. Since the voids are formed, the scattering effect in the scattering layer 17 can be further enhanced. Because the refractive index of the air in the voids is as small as 1.0, they can have a significant difference in refractive index from the glass matrix 19, thus providing a greater scattering effect. The voidage is preferably 20 to 60% and more preferably 30 to 50%.

The phosphor layer 12 and the scattering layer 17 can be produced, for example, by the following method.

A slurry containing glass particles forming a glass matrix of the phosphor layer 12, a phosphor, and organic components such as a binder resin and a solvent is applied to a resin film made of polyethylene terephthalate or other materials by the doctor blade method or other methods and dried by the application of heat to produce a green sheet for the phosphor layer 12.

Likewise, a slurry containing glass particles forming a glass matrix of the scattering layer 17, inorganic particles, and organic components such as a binder resin and a solvent is applied to a resin film made of polyethylene terephthalate or other materials by the doctor blade method or other methods and dried by the application of heat to produce a green sheet for the scattering layer 17.

The obtained green sheet for the phosphor layer 12 and green sheet for the scattering layer 17 are laminated and the laminated green sheets are fired, so that a laminate of the phosphor layer 12 and the scattering layer 17 can be formed.

The obtained laminate can be bonded by fusion or an inorganic bonding layer to the ceramic substrate 11 in the manners described above.

The method for producing the laminate of the phosphor layer 12 and the scattering layer 17 is not limited to the above production method. For example, the laminate may be produced by applying a slurry for forming the scattering layer 17 onto a green sheet for the phosphor layer 12 or applying a slurry for forming the phosphor layer 12 onto a green sheet for the scattering layer 17.

FIG. 9 is a schematic side view showing a light emitting device for a projector in which the fluorescent wheel for a projector according to the first embodiment of the present invention is used. A light emitting device 30 for a projector according to this embodiment includes the fluorescent wheel 10, a light source 20, and a motor 21 for rotating the fluorescent wheel 10. The annular fluorescent wheel 10 is attached to a rotary shaft 22 of the motor 21 rotatably in the circumferential direction with the central axis C of the rotary shaft 22 as the center of rotation. In this embodiment, the reflective layer 13 formed of a reflective metal substrate and the ceramic substrate 11 provided with the phosphor layer 12 are separately attached to the rotary shaft 22 of the motor 21 and made physical contact with each other.

Excitation light 1 emitted from the light source 20 enters the phosphor layer 12 of the fluorescent wheel 10. The excitation light 1 having entered the phosphor layer 12 excites the phosphor 14, so that fluorescence 2 is emitted from the phosphor 14. The fluorescence 2 emitted toward the ceramic substrate 11 is partly reflected on the surface of the ceramic substrate 11 and partly transmits the ceramic substrate 11. The fluorescence 2 having transmitted the ceramic substrate 11 is reflected on the surface of the reflective layer 13, passes through the ceramic substrate 11, and is then emitted toward the phosphor layer 12.

Examples of the light source 20 that can be cited include an LED light source and a laser light source. In the case of using as the light source 20 a light source emitting blue light as excitation light, for example, a phosphor excited by blue light to emit yellow light, green light or red light can be used as the phosphor for the phosphor layer 12. It is possible to extract, from the light emitted from the phosphor layer 12, only part thereof having a desired wavelength using a filter as necessary. An annular filter may be attached to the rotary shaft 22 and rotated in synchronism with the fluorescent wheel 10 to filter the emitted light.

In this embodiment, the fluorescent wheel 10 is configured to rotate circumferentially. As described previously, heat transferred from the phosphor to the ceramic substrate 11 and the reflective layer 13 (the reflective metal substrate) is released from the ceramic substrate 11 and the reflective layer 13 to the outside. Since the fluorescent wheel 10 rotates circumferentially, heat release from the ceramic substrate 11 and the reflective layer 13 to the outside is further promoted.

The description here takes as an example the light emitting device for a projector in which the fluorescent wheel for a projector according to the first embodiment is used. However, the fluorescent wheels for projectors according to the second and third embodiments can likewise be used for a light emitting device for a projector.

In the fluorescent wheel 10 according to the above embodiments, a phosphor of the same type is contained in the whole area of the phosphor layer 12. However, the present invention is not limited to this form. As in an embodiment to be described below, the phosphor layer 12 may be divided into a plurality of regions along the circumferential direction thereof and the plurality of regions may contain different types of phosphors.

FIG. 10 is a perspective view showing a fluorescent wheel for a projector according to a fourth embodiment of the present invention. The fluorescent wheel 10 shown in FIG. 10 has two sets of regions: first region 12a, second region 12b, and third region 12c. These regions are provided as circumferential sections as shown in FIG. 10. These regions can be provided to correspond to different regions emitting, for example, red light, green light or blue light, respectively, to use the fluorescent wheel 10 as a color wheel. Also in this case, by the provision of the ceramic substrate 11, the heating of the phosphor layer 12 can be suppressed. Alternatively, any one of the first regions 12a, the second region 12b, and the third region 12c may be a region not provided with the phosphor layer 12.

REFERENCE SIGNS LIST

1 . . . excitation light
2 . . . fluorescence
10 . . . fluorescent wheel
11 . . . ceramic substrate
11a . . . first principal surface
11b . . . second principal surface
12 . . . phosphor layer
12a . . . first region
12b . . . second region
12c . . . third region
13 . . . reflective layer
14 . . . phosphor
15 . . . glass matrix
16 . . . thermally conductive layer
17 . . . scattering layer
18 . . . inorganic particle
19 . . . glass matrix
20 . . . light source
21 . . . motor
22 . . . rotary shaft
23 . . . restraining member
24 . . . restraining member
25 . . . through hole
30 . . . light emitting device for projector

The invention claimed is:

1. A fluorescent wheel for a projector comprising:
   a phosphor layer;
   an annular ceramic substrate which includes a first principal surface provided with the phosphor layer and a second principal surface located on an opposite side to the first principal surface and has a higher thermal conductivity than the phosphor layer; and
   a reflective layer provided on the second principal surface of the ceramic substrate.

2. The fluorescent wheel for a projector according to claim 1, wherein the reflective layer is a reflective metal layer or a reflective glass layer.

3. The fluorescent wheel for a projector according to claim 1, wherein the phosphor layer is bonded by fusion to the ceramic substrate.

4. The fluorescent wheel for a projector according to claim 1, wherein the phosphor layer is bonded by an inorganic bonding layer to the ceramic substrate.

5. The fluorescent wheel for a projector according to claim 1, wherein the reflective layer is a reflective metal substrate.

6. The fluorescent wheel for a projector according to claim 5, wherein the reflective metal substrate is an aluminum substrate.

7. The fluorescent wheel for a projector according to claim 1, wherein a thermally conductive layer is provided on the second principal surface and the reflective layer is in turn provided on the thermally conductive layer.

8. The fluorescent wheel for a projector according to claim 7, wherein the thermally conductive layer is formed of a thermally conductive paste.

9. The fluorescent wheel for a projector according to claim 8, wherein the thermally conductive paste is a paste containing metal particles.

10. The fluorescent wheel for a projector according to claim 1, further comprising a scattering layer provided between the phosphor layer and the ceramic substrate, wherein the scattering layer contains inorganic particles made of an oxide or nitride of at least one selected from the group consisting of Al, Nb, Ta, La, Zr, Ce, Ga, Mg, Si, and Zn.

11. The fluorescent wheel for a projector according to claim 1, wherein the phosphor layer contains a glass matrix and a phosphor dispersed in the glass matrix.

12. The fluorescent wheel for a projector according to claim 1, wherein the scattering layer contains a glass matrix and the inorganic particles dispersed in the glass matrix.

13. The fluorescent wheel for a projector according to claim 12, wherein the glass matrix of the phosphor layer is made of substantially the same glass as the glass matrix of the scattering layer.

14. The fluorescent wheel for a projector according to claim 1, wherein the phosphor layer is divided into a plurality of regions along a circumferential direction thereof and the plurality of regions contain different types of phosphors.

15. A light emitting device for a projector comprising:
   the fluorescent wheel for a projector according to claim 1; and
   a light source capable of irradiating the phosphor layer of the fluorescent wheel with excitation light.

* * * * *